: 3,085,100
Patented Apr. 9, 1963

3,085,100
OXYALKYLATED LECITHIN
Stephen S. Chang, Franklin Park, N.J., assignor to A. E. Staley Manufacturing Company, Decatur, Ill., a corporation of Delaware
No Drawing. Filed Dec. 5, 1960, Ser. No. 73,492
10 Claims. (Cl. 260—403)

This invention relates to a new lecithin composition comprising at least one oxyalkylated phospholipin and a glyceride oil, which is readily dispersible in an aqueous medium.

Commercial lecithin, which is a crude material containing a mixture of phospholipins as the primary ingredient, contains, among other ingredients, minor quantities of water-insoluble glyceride oil and free fatty acids. When commercial lecithin is sold by the manufacturer, it usually has a substantial amount of the glyceride oil. The proportion of glyceride oil present in the lecithin composition is usually equal to 100 minus the "A.I." value, wherein "A.I." stands for acetone insolubles in the lecithin composition. Soybean lecithin, for example, is commonly sold having A.I. values of 50, 60 and 70. This means that the composition has from 30 to 50% soybean oil and from 70 to 50% phospholipins. As used herein, the term "lecithin" has its commercial meaning and refers to a group of crude materials containing a mixture of phospholipins as the primary ingredient, which may also contain, among other ingredients, varying quantities of glyceride oil and free fatty acid, commonly 60% or less.

Although commercial lecithin is frequently used as a surface active agent, it is not readily dispersible in water. The hydrophilic and hydrophobic groups of the phospholipins are not balanced to serve efficiently as an emulsifier to disperse the mixture of glyceride oil and phospholipins in water. This problem is accentuated as the A.I. of the lecithin composition decreases.

A variety of techniques have been attempted in order to render lecithin more water-dispersible or water-soluble. These techniques have included modifying pure or crude lecithin by reacting it with various ingredients such as polyhydric alcohols and epoxy compounds, fractionating crude lecithin into the pure, individual phospholipins, and compounding crude lecithin with various dispersing agents.

For example, De Groote et al. in U.S. Patent 2,310,679 disclose reacting purified lecithin or lecithin and its cogeners with an epoxy compound, wherein the epoxy compound is present in an amount equal to from 5 to 40 moles per mole of lecithin, at a temperature of from 100° C. to 200° C. Apparently, De Groote et al. were interested in rendering phosphatides themselves more water-soluble. However, this treatment reduces the compatibility of the phospholipins with the glyceride oil.

While these techniques have had varying degrees of success, the object of this invention is to prepare a new lecithin composition, comprising a new phospholipin derivative and glyceride oil which is readily dispersible in water and which does not lose its water-dispersibility on standing.

The new lecithin composition of this invention is the reaction product of essentially equal molar quantities of the phospholipin portion of lecithin and of glycidol, in which the phospholipins comprise from 40 to 98% of the lecithin composition. The remainder of the lecithin composition is glyceride oil and free fatty acid. This reaction product is not only readily dispersible in water immediately after it is prepared, but it remains water-dispersible even after storage for considerable periods of time. The water-dispersibility of the product is independent of the purity of the lecithin. In other words both commercial lecithin containing up to 60% by weight glyceride oil and granular lecithin containing from 2–5% glyceride oil disperse equally well in water after being reacted according to this invention.

In reacting glycidol with lecithin having less than 95% phospholipins, I have found that if more than one mole of glycidol reacts with one mole of phospholipin, the product will separate into a fluid oil phase and a plastic phospholipin phase. This mixture has substantially lower water-dispersibility than the reaction product obtained when the reaction is limited to equal molar quantities of phospholipin and glycidol. It is my belief that the first reaction product, wherein the mol ratio of phospholipin to glycidol is less than one, is so hydrophilic that it is incompatible with the oil portion of the lecithin. On the other hand, when the reaction of lecithin and glycidol is limited to equal molar quantities of glycidol and phospholipin (the phospholipin being at least 40% of the lecithin) the product has an unusually well-balanced number of hydrophilic and hydrophobic groups. By equal molar quantity I mean that each mole of phospholipin (890 grams of acetone insolubles) has reacted with between 0.9 and 1.1 moles of glycidol. The lecithin composition can be viewed as having on an average one dihydroxypropoxy group for each phospholipin molecule. This reaction product is surprisingly compatible with both water and oil.

For example, 60 parts by weight granular lecithin, which has been reacted with an equal molar quantity of glycidol, can be dissolved directly in 40 parts by weight soybean oil; the resultant composition of modified lecithin and soybean oil is water-dispersible. This solubility of granular lecithin in soybean oil is unexpected since granular lecithin can be dissolved in this quantity of soybean oil only by dissolving both ingredients in a mutual solvent such as hexane.

Although the new lecithin derivative of this invention is the reaction product of equal molar quantities of glycidol and the phospholipin fraction of lecithin, the reaction mixture from which it is prepared may contain from one to six moles of glycidol per mole of phospholipin. However, it is essential that the reaction be discontinued after approximately one mole of glycidol has reacted with one mole of phospholipin. When the reaction is allowed to continue past this point, the water-dispersibility of the lecithin composition is decreased and, if the reaction is continued far enough, the phospholipin composition will become incompatible with the triglyceride oil and precipitate out as a separate phase. Although a small excess of glycidol (e.g., up to four moles glycidol per mole of phospholipin) makes the reaction more rapid, the presence of a higher ratio of glycidol to phospholipin in the reaction mixture is not advantageous. The higher the ratio of glycidol to phospholipin in the reaction mixture, the harder it is to control the extent of oxyalkylation of the phospholipin. It is also essential that the unreacted glycidol be removed from the lecithin composition, since the lecithin composition containing free glycidol loses its water-dispersibility after standing 2 to 14 days, depending on how much free glycidol is present. This occurs because the free glycidol continues to react with the oxyalkylated phospholipin on standing even at room temperature. Accordingly, substantially all free oxirane groups (free glycidol) must be eliminated from the reaction product, for example, by vacuum distillation of the unreacted glycidol, or by solvent extraction of the unreacted glycidol, or by hydrolysis of the free oxirane groups remaining in the reaction mixture. While a product having a free oxirane value of 0.2 (actual oxirane value of the isolated product minus the oxirane value of the unreacted lecithin) has relatively good water-dispersibility after standing at room temperature for a month or more, the lower the oxirane value, the longer the oxyalkylated lecithin can be stored without loss of its water-dispersibility.

In those cases where significantly more than one mole of glycidol is present in the reaction mixture per mole of phospholipin, it is necessary to know approximately how long the reaction should be continued in order to get a lecithin composition of maximum water-dispersibility. The rate of reaction is primarily a function of the temperature at which the reaction is carried out and to a much lesser extent dependent on the molar excess of glycidol. Usually, the reaction vessel is maintained at a temperature between 20° C. and 90° C. Although temperature above 90° C. may be employed, it is preferable to avoid such elevated temperatures since the lecithin tends to darken noticeably with the attendant breakdown of the phospholipin molecules. The water-dispersibility of the lecithin composition increases to a maximum when the reaction between from two to four moles of glycidol and one mole of phospholipin is run for: (A) 24 to 48 hours at 20° C., (B) between two and three hours at 60° C., and (C) between two and three hours at 90° C. If these lecithin compositions are kept at the above temperatures for more than the stated time, the products are of reduced water-dispersibility.

The lecithin used in this invention can be derived from any glyceride oil, such as soybean oil, cottonseed oil, linseed oil, corn oil, etc. The lecithin may be natural, bleached or pigmented. The preferred lecithin of this invention is a bleached soybean oil lecithin. Bleached lecithin is preferred, since the ultimate lecithin composition of this invention finds its greatest utility in compositions where color in the lecithin composition adversely affects the color of the composition in which it is used. For example, the preferred composition of this invention is useful as a pigment wetting and suspending agent; as an additive to laundry starch where it serves as an ironing aid; as a dispersing agent in paints. In these uses a colored lecithin composition is undesirable.

The glyceride oils used in this invention may be monoglycerides, diglycerides or triglycerides, which are derived from oils such as soybean oil, cottonseed oil, linseed oil, corn oil, etc.

The fluidity of the product may be improved by adding from 1% to 3% fatty acids such as soybean fatty acids.

The following examples are merely illustrative and should not be construed as limiting the scope of this invention. The oxirane values that are referred to in the following examples were determined by the standard HBr-glacial acetic acid titration method.

EXAMPLE 1

Twenty grams of glycidol (0.27 mole) was added to 400 grams of soybean lecithin having an A.I. of 65 in a three-necked flask, fitted with a stirrer, condenser and thermometer The soybean lecithin contained 0.29 mole of phospholipins, having an average molecular weight of 890, and 140 grams of soybean oil. The mixture was heated at 85° C. for three hours. The product had good water-dispersibility and remained so the next day. After one month the sample was still readily dispersible in water. The oxirane value of the product two days after preparation was 1.15 as contrasted to a 1.06 oxirane blank value for the starting lecithin composition.

EXAMPLE 2

This example illustrates the effect of unreacted glycidol on the water-dispersibility of a lecithin reaction product with glycidol. One hundred and forty-eight grams of glycidol (2 moles) was added to 780 grams of soybean lecithin having an A.I. of 65 in a three-necked flask fitted with a stirrer, condenser and thermometer. The soybean lecithin contained 0.57 mole of phospholipins, having an average molecular weight of 890, and 273 grams of soybean oil. The mixture was stirred at 70–75° C. for three hours. A sample (B) was then removed from the reaction vessel and was found to be fluid and water-dispersible. Then the reaction vessel was heated under a vacuum at 75° C. for one hour in order to remove unreacted glycidol. A second sample (C) was removed from the reaction vessel, and it was found to be fluid and water-dispersible.

A 200 gram sample of (C) was dissolved in 2,000 ml. of Skellysolve F (primarily a pentane hydrocarbon fraction) and the solution was washed three times with 500 ml. portions of water. The hydrocarbon solution was dried with sodium sulfate and then freed of solvent. The product (D) was water-dispersible.

*Table I*

OXIRANE CONTENT OF SAMPLES IMMEDIATELY AFTER PREPARATION

| Sample: | Oxirane value |
|---|---|
| Lecithin blank | 1.06 |
| Sample B | 2.58 |
| Sample C | 1.92 |
| Sample D | 1.07 |

After standing two weeks at room temperature, samples B and C were no longer water-dispersible. Sample D remained water-dispersible.

EXAMPLE 3

Thirty grams of glycidol (0.4 mole) was added to 300 grams of soybean lecithin having an A.I. of 65 in a three-necked flask fitted with a stirrer, condenser and thermometer. The soybean lecithin contained 0.22 mole of phospholipin, having an average molecular weight of 890, and 105 grams of soybean oil. The mixture was stirred at 70° C.–80° C. for three hours. The unreacted glycidol was removed by vacuum distillation at 100° C. Thirteen grams of glycidol (0.17 mole) were recovered, indicating that 0.23 mole of glycidol had reacted with the 0.22 mole of phospholipins. The product was water-dispersible.

EXAMPLE 4

Two-hundred and fifty grams of glycidol (3.38 moles) was added over an hour and forthy minute period of 2,500 grams of soybean lecithin having an A.I. of 65 at a temperature between 80° C. and 85° C. After heating for another 50 minutes at this temperature, a first sample was removed and found to be easily water-dispersible. The reaction mixture was heated for another hour and fifty minutes at which point the product was turbid and viscous. The final product was much less water-dispersible than the first sample.

EXAMPLE 5

Twenty-two and six-tenths grams of glycidol (0.31 mole) were added over a 1½ hour period to 225.8 grams of soybean lecithin having an A.I. of 65 at 60° C. After heating at 60° C. for 20 minutes, a water-dispersible first sample was formed. After the reaction mixture was heated for another 50 minutes, a second product, having better water-dispersibility than the first product, was isolated The unreacted glycidol was then stripped off rapidly under vacuum at 100° C. The final product had excellent water-dispersibility and remained so after standing for five months.

EXAMPLE 6

Ninety grams of acetone-insoluble granular lecithin was dried by distilling with 450 ml. of xylene in order to remove residual water. After 100 ml. of xylene was distilled off, 8.2 grams of glycidol (0.11 mole) were added to the lecithin. The composition was refluxed for two hours. Most of the xylene was then stripped off and the solution of lecithin was precipiated in acetone. The granular product was washed in acetone and then dried under a vacuum.

The granular product was water-dispersible. Sixty grams of the granular product was dissolved in 40 grams soybean oil and one gram soybean fatty acid. This composition was also water-dispersible.

EXAMPLE 7

This example corresponds to Example 3 of De Groote et al. 2,310,679, and illustrates the incompatibility of glyceride oil with the product of the De Groote reaction. Thirty-seven grams of glycidol (0.5 mole) was added to 118 grams of soybean lecithin having an A.I. of 65 in a three-necked flask fitted with a stirrer, condenser and thermometer. The soybean lecithin contained 0.086 mole of phospholipin, having an average molecular weight of 890, and 41.3 grams soybean oil. The mixture was heated at 100° C. for 3½ hours during which time essentially all of the glycidol reacted. The reaction mixture was subjected to a stripping operation to make sure that the product contained no residual glycidol. The reaction product separated into two distinct layers: a gummy heavier layer of modified lecithin and a lighter layer of soybean oil, the latter having about twice the volume of the former. The gummy product would not disperse in oil although it was water-soluble. The oil layer was not water-dispersible. A mixture of oil and gummy product was added to water. The gummy product dissolved while the oil formed globules in the water.

Since many embodiments of this invention may be made and since many changes may be made in the embodiments described, the foregoing is to be interpreted as illustrative only, and my invention is defined by the claims appended hereafter.

I claim:

1. The process of forming a water-dispersible, oil-dispersible lecithin composition, which comprises chemically combining a lecithin having an A.I. of at least 40 with glycidol in the ratio of about one mole of glycidol per mole of phospholipin in said lecithin.

2. The process of claim 1 wherein approximately one mole of glycidol is present in the reaction mixture for each mole of phospholipin in said lecithin.

3. The process of claim 1 wherein more than one mole of glycidol is present in the reaction mixture for each mole of phospholipin in said lecithin, and then eliminating substantially all free oxirane groups from the reaction mixture.

4. The process of claim 1 wherein the reaction is carried out within the temperature range of 20° C. to 90° C.

5. The process of forming a water-dispersible, oil-dispersible lecithin composition which comprises chemically combining a lecithin composition comprising from 40 to 95 weight percent phospholipin and from 60 to 5 weight percent glyceride oil with glycidol in the ratio of about one mole of glycidol per mole of phospholipin in said lecithin composition.

6. The process of claim 5 wherein approximately one mole of glycidol is present in the reaction mixture for each mole of phospholipin.

7. The process of claim 5 wherein more than one mole of glycidol is present in the reaction mixture for each mole of phospholipin, and then eliminating substantially all free oxirane groups from the reaction mixture.

8. The process of claim 5 wherein the reaction is carried out within the temperature range of 20° C. to 90° C.

9. A water-dispersible, oil-dispersible lecithin composition which comprises the chemical combination of a lecithin having an A.I. of at least 40 with glycidol in the ratio of about one mole of glycidol per mole of phospholipin in said lecithin.

10. A water-dispersible, oil-dispersible lecithin composition having on an average approximately one dihydroxypropoxy group for each phospholipin molecule in the lecithin composition.

References Cited in the file of this patent
UNITED STATES PATENTS
2,310,679    De Groote et al. _____ Feb. 9, 1943